United States Patent
Yamawaki et al.

(10) Patent No.: US 8,657,922 B2
(45) Date of Patent: Feb. 25, 2014

(54) PRESSURE SWING ADSORPTION-TYPE GAS SEPARATION METHOD AND SEPARATION APPARATUS

(75) Inventors: Masaya Yamawaki, Tsukuba (JP); Yoshio Ishihara, Tsuchiura (JP); Tadanobu Arimura, Tsukuba (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 243 days.

(21) Appl. No.: 13/262,092

(22) PCT Filed: Mar. 17, 2010

(86) PCT No.: PCT/JP2010/001899
§ 371 (c)(1),
(2), (4) Date: Sep. 29, 2011

(87) PCT Pub. No.: WO2010/116623
PCT Pub. Date: Oct. 14, 2010

(65) Prior Publication Data
US 2012/0024152 A1  Feb. 2, 2012

(30) Foreign Application Priority Data
Mar. 30, 2009  (JP) ................ P2009-080754

(51) Int. Cl.
*B01D 53/04* (2006.01)
(52) U.S. Cl.
USPC ........... 95/96; 95/106; 96/126; 96/131
(58) Field of Classification Search
USPC .......... 95/96, 99, 106, 14, 16; 96/109, 112, 96/121, 126, 131, 132
See application file for complete search history.

(56) References Cited

U.S. PATENT DOCUMENTS

| 3,069,830 | A |   | 12/1962 | Skarstrom et al. |       |
|-----------|---|---|---------|------------------|-------|
| 4,026,680 | A | * | 5/1977  | Collins          | 95/99 |
| 4,343,629 | A | * | 8/1982  | Dinsmore et al.  | 95/93 |
| 5,169,413 | A | * | 12/1992 | Leavitt          | 95/96 |

(Continued)

FOREIGN PATENT DOCUMENTS

| CN | 101012146 A   | 8/2007  |
|----|---------------|---------|
| DE | 33 19 664 A1  | 12/1984 |

(Continued)

OTHER PUBLICATIONS

International Search Report for PCT/JP2010/001899, mailed Apr. 27, 2010.

(Continued)

*Primary Examiner* — Frank Lawrence, Jr.
(74) *Attorney, Agent, or Firm* — Nixon & Vanderhye P.C.

(57) ABSTRACT

A method which separates a component which is easily adsorbed by an adsorbent and a component which is not easily adsorbed by the adsorbent, from a feed gas which includes at least two kinds of components, with adsorption columns, wherein the adsorbent is filled in the adsorption columns and has strong adsorbability with respect to at least one kind of component included in the feed gas, and also has weak adsorbability with respect to at least one kind of other components included in the feed gas, and a temperature of the adsorbents which is filled in the column is maintained to be higher than the highest temperature of an ambient temperature around the adsorption columns which is variable throughout the year.

6 Claims, 4 Drawing Sheets

(56) References Cited

U.S. PATENT DOCUMENTS

| | | | |
|---|---|---|---|
| 5,288,311 A * | 2/1994 | Furutani et al. | 96/110 |
| 6,030,435 A * | 2/2000 | Monereau et al. | 95/14 |
| 6,051,051 A * | 4/2000 | Hees et al. | 95/96 |
| 6,471,748 B1 * | 10/2002 | Ackley | 95/96 |
| 8,377,171 B2 * | 2/2013 | Brown et al. | 95/115 |

FOREIGN PATENT DOCUMENTS

| | | | |
|---|---|---|---|
| JP | 04-293513 A * | 10/1992 | |
| JP | 8-052317 | 2/1996 | |
| JP | 11-179137 | 7/1999 | |
| JP | 2006-061831 | 3/2006 | |
| JP | 2008-12439 | 1/2008 | |
| JP | 2009-39686 | 2/2009 | |

OTHER PUBLICATIONS

EP Search Report in EP 10 76 1331 dated Jul. 19, 2012.

Office Action and English translation of Search Report in CN 201080013823.8 mailed Jun. 5, 2013.

* cited by examiner

PRESSURE SWING ADSORPTION-TYPE GAS SEPARATION METHOD AND SEPARATION APPARATUS

TECHNICAL FIELD

The present invention relates to a pressure swing adsorption-type gas separation method and a pressure swing adsorption-type gas separation apparatus, and more particularly, the present invention relates to a pressure swing adsorption-type gas separation method and a separation apparatus which separate and collect a high value added gas (for example, xenon, krypton and the like) from a gas mixture which includes such a high value added gas.

This application is the U.S. national phase of International Application No. PCT/JP2010/001899, filed Mar. 17, 2010, and claims priority on Japanese Patent Application No. 2009-80754, filed Mar. 30, 2009, the contents of each of which are incorporated herein by reference.

BACKGROUND ART

In manufacturing steps wherein semiconductor products such as a semiconductor integrated circuit, a liquid crystal panel, a solar battery panel and a magnetic disk are produced, an apparatus has been widely used which generates plasma due to high-frequency discharges under a rare gas atmosphere and uses the generated plasma to perform various treatments of semiconductor products or display devices.

Although argon has conventionally been used as a rare gas which is applied to such treatments, krypton and xenon have attracted attention in recent years to perform more advanced treatments.

In the field of lamps, although argon has conventionally been used as a filler gas enclosed in a lamp, a high value added product has been produced in recent years wherein krypton or xenon is used therein to reduce electrical power consumption and improve brightness.

On the other hand, xenon, which causes no adverse drug action, has attracted attention in the medical field as an anaesthesia, instead of nitrous oxide, which has conventionally been used.

However, krypton and xenon are extremely rare and expensive from the view point of their abundance ratio in air and complicated steps are required to separate the gases, and therefore, there is a problem in that cost greatly increases when such an expensive gas is used.

In order to enable the use of such a rare gas economically, it is extremely important to separate and collect a spent rare gas at a high collecting ratio and perform cyclic use thereof.

For example, Japanese Unexamined Patent Application, First Publication No. 2006-61831 proposes a method wherein a high value added gas is separated and collected at high concentration and a high collection ratio from a spent gas mixture including such a high value added gas.

This invention proposes a separation and collection method which uses a pressure swing adsorption method (PSA method), wherein steps (a) to (e), which are shown in FIG. 2 and described below, are performed according to a certain sequence which is determined in advance. A device used in the invention includes: a feed gas storage tank; a strong adsorbate storage tank which stores a strong adsorbate; a weak adsorbate storage tank which stores a weak adsorbate; a compressor which compresses a gas included in the feed gas storage tank or the strong adsorbate storage tank; a compressor which compresses a gas in the strong adsorbate storage tank; four adsorption columns consisting of lower columns 10B and 11B, and upper columns 10U and 11U; and valves which are provided at predetermined positions.

(Step a)

A lower column 10B and an upper column 10U are filled with an adsorbent which has strong adsorbability with respect to one component (a strong adsorbate) of a gas mixture and also has weak adsorbability with respect to other components (a weak adsorbate) of the gas mixture. The gas mixture (a feed gas, that is, a gas to which separation and collection is performed) which includes at least a strong adsorbate and a weak adsorbate, that is, includes two or more kinds of components, is introduced into the lower column 10B from a feed gas storage tank 1. Then, a gas in which a strong adsorbate has reduced is discharged from the lower column 10B and is introduced to the upper column 10U, so that a strong adsorbate is adsorbed by the adsorbents of the lower column 10B and the upper column 10U. A weak adsorbate which has passed through the lower column 10B and the upper column 10U is collected by a weak adsorbate storage tank 3 which connects with the upper column 10U. When the step (a) is completed, no adsorption band of a strong adsorbate arrives at the upper positions of the adsorption columns.

(Step b)

From a strong adsorbate storage tank 2 which stores a strong adsorbate, a gas (strong adsorbate) is introduced to the lower column 10B, to which a strong adsorbate has been adsorbed, so that a weak adsorbate remaining in a space of the lower column 10B is sent to the upper column 10U, and a strong adsorbate included in the gas sent from the lower column 10B to the upper column 10U is adsorbed by the upper column 10U. A weak adsorbate which is discharged from the upper column 10U is collected, and is transferred to the upper column 11U in which a step (e) has been completed.

(Step c)

The lower column 10B is decompressed to desorb a strong adsorbate from the lower column 10B, and the desorbed strong adsorbate is collected by the strong adsorbate storage tank 2.

(Step d)

The upper column 10U is decompressed to desorb a gas (a mixture of a strong adsorbate and a weak adsorbate) which has been adsorbed by the upper column 10U, and the desorbed gas is introduced in the lower column 10B and a gas discharged from the lower column 10B is collected in the feed gas storage tank 1.

(Step e)

The weak adsorbate collected in the weak adsorbate storage tank 3 is introduced into the decompressed upper column 10U as a purge gas. A gas discharged from the upper column 10U is introduced in the lower column 10B. In this way, a strong adsorbate is desorbed by displacement at the upper column 10U and the lower column 10B, and a gas (a mixture of a weak adsorbate and a strong adsorbate) discharged from the lower column 10B is collected in the feed gas storage tank 1.

In this way, a weak adsorbate and a strong adsorbate are collected simultaneously at a high concentration and a high collection ratio.

In such a method for separating and collecting a high value added gas wherein a pressure swing adsorption-type gas separation method is used as described above, in order to collect a weak adsorbate and a strong adsorbate effectively, it is important that the interior of the lower column 10B is saturated by adsorbing a strong adsorbate and that a strong adsorbate that has arrived at the upper column 10U is completely adsorbed, that is, it is important to control a position (height) of an adsorption band of a strong adsorbate so that a strong adsorbate is not discharged from the upper column 10U when the step b is completed.

For example, when a strong adsorbate is introduced in succession in the upper column 10U to which a strong adsorbate has not been introduced, an adsorption band (a portion where adsorption of a strong adsorbate is proceeding) is generated therein at a side where the gas is introduced to the upper column 10U. With the passage of time, the adsorption band moves toward the upper end of the column, and on the other hand, a saturation band (a portion where the amount of the adsorbed strong adsorbate reaches saturated level) is generated subsequent to the adsorption band at the side to which the gas is introduced.

Accordingly, operation conditions and the like are generally controlled in the step b such that the interior of the lower column 10B is saturated by adsorbing a strong adsorbate, and the upper column 10U adsorbs a strong adsorbate completely.

By the way, adsorptivity of an adsorbent depends on a temperature. It is known that the lower a temperature of an adsorbent is, the larger the adsorption amount of a gas adsorbed in the adsorbent is.

Accordingly, there is a problem that, if an ambient temperature around an apparatus which is in operation is slightly changed, in particular, if an ambient temperature around adsorption columns is changed and therefore a temperature of the an adsorbent thereof is changed, each adsorption band of a strong adsorbate in the upper column 10U and the lower column 10B, which has moved by the end of the step b, is shifted, and a collection ratio and collection purity of a strong adsorbate and a weak adsorbate, which should be separated and collected, decrease. It is not preferable that, when the step b is completed, a weak adsorbate remain in the lower column, nor a strong adsorbate be discharged from the upper column.

The adsorption band represents an inflection point (band) at which concentration distribution of a component to be adsorbed is suddenly varied.

When an ambient temperature decreases, an amount of a gas adsorbed in an adsorbent increases and speed of an adsorption band of a strong adsorbate which moves in an adsorption column decreases in general. Accordingly, if operational conditions or the like other than said decrease of temperature are the same, a weak adsorbate remains in the lower column 10B in the step b without being transferred to the upper column 10U from the lower column 10B, and the remaining weak adsorbate is collected by the weak adsorbate storage tank 2 in the step c. As a result, purity of a strong adsorbate collected and a collection ratio of a weak adsorbate decrease.

FIG. 3 shows concentration distribution of a strong adsorbate existing in the lower column 10B and the upper column 10U, wherein the distribution is measured after a predetermined time has been passed and the step b is completed. A longitudinal axis thereof represents concentration of a strong adsorbate, and a horizontal axis represents the total value of height of the lower column 10B and the upper column 10U. The figure shows variation of concentration distribution when an ambient temperature around an apparatus decreases.

In the graph, a curve A represents concentration distribution of a strong adsorbate at a standard temperature A, and a curve C represents concentration distribution of a strong adsorbate at a temperature C which is lower than said standard temperature A.

The curve A represents a state wherein the interior of the lower column 10B has been saturated with a strong adsorbate which is adsorbed thereto, and the upper column 10U has completely adsorbed a strong adsorbate.

The curve C represents that a weak adsorbate remains in the lower column 10B without being discharged from the lower column 10B to the upper column 10U.

On the other hand, when an environment temperature increases, a gas amount adsorbed by an adsorbent decreases, the moving rate of an adsorption band of a strong adsorbate increases in the adsorption column, and as a result, a strong adsorbate arrives at the uppermost position of the upper column 10U in the step b. Accordingly, purity of a weak adsorbate and a collecting ratio of a strong adsorbate decrease.

FIG. 4 shows concentration distribution of a strong adsorbate included in the lower column 10B and the upper column 10U, wherein the distribution is measured after a predetermined time has been passed and the step b is completed. The figure shows variation of concentration distribution when an ambient temperature increases.

In the figure, a curve A represents concentration distribution of a strong adsorbate at a predetermined standard temperature A, and a curve B represents concentration distribution of a strong adsorbate at a temperature B which is higher than said standard temperature A.

The curve B shows that a strong adsorbate arrives at the uppermost position of the upper column 10U, before the step b is completed.

In FIGS. 3 and 4, separation at a temperature C or B is performed using operational conditions or the like which are set according to the standard temperature A.

A separation apparatus may be installed in a room, in which an air conditioning device is provided and controls a temperature uniformly throughout the year, in order to prevent decrease of collection purity and a collection ratio of a strong adsorbate and a weak adsorbate wherein such a decrease is caused by aforementioned variation of an ambient temperature, and to achieve stable separation ability throughout the year.

However, large energy is required for initial cost and running cost of such a system, and therefore a cost thereof increases.

PRIOR ART DOCUMENTS

Patent Documents

Patent document 1: Japanese Unexamined Patent Application, First Publication No.

DISCLOSURE OF INVENTION

Problem to be solved by the Invention

The present invention was made to solve the aforementioned problem, and a purpose of the present invention is to provide a pressure swing adsorption-type gas separation method and a pressure swing adsorption-type separation apparatus, wherein they enable a collecting ratio and purity of separated and collected strong adsorbate and weak adsorbate to be maintained, even if an ambient temperature varies, and which can be manufactured cost effectively.

Means for Solving the Problem

In order to solve the problem, the present invention provides the following aspect.

The first aspect of the present invention is:

a pressure swing adsorption-type gas separation method, which separates a component which is easily adsorbed by an adsorbent and a component which is not easily adsorbed by the adsorbent, from a feed gas which includes at least two kinds of components, with adsorption columns, wherein the adsorbent is filled in the adsorption columns, and the adsorbent has strong adsorbability with respect to at least one kind of component included in the feed gas and also has weak adsorbability with respect to at least one kind of other components included in the feed gas, and a temperature of the adsorbent which is filled in the columns is maintained to be higher than the highest temperature of an ambient temperature around the adsorption columns, which is variable throughout the year.

In the first aspect of the present invention, it is preferable that the adsorption columns be structured with a lower column and an upper column, and a temperature of the upper column be controlled to be lower than a temperature of the lower column.

The second aspect of the present invention is a pressure swing adsorption-type gas separation apparatus, which comprises;

adsorption columns which include an upper column and a lower column wherein the columns are filled with an adsorbent which has strong adsorbability with respect to at least one kind of component included in a feed gas and also has weak adsorbability with respect to at least one kind of other components included in the feed gas, wherein the feed gas includes at least two kinds of components;

a heating device which is provided to the upper column and the lower column to heat the columns; and a temperature control device which controls the heating device and maintains a temperature of the adsorbent which is filled in the columns to be higher than the highest temperature of an ambient temperature around the columns which is variable throughout the year.

In the second aspect of the present invention, it is preferable that the temperature control device control a temperature so that a temperature of the upper column is less than a temperature of the lower column.

Effects of the Invention

According to a pressure swing adsorption-type gas separation method and a pressure swing adsorption-type gas separation apparatus of the present invention, adsorption characteristics of an adsorbent used therein do not vary, since a temperature of an adsorbent is always maintained uniformly even if an ambient temperature around the gas separation apparatus varies. As a result, the position of an adsorption band in an adsorption column is not changed over the presupposed position. Therefore, it is possible to stably separate and collect a high value added gas at high purity (high concentration) and a high collecting ratio from a feed gas which includes a high value added gas.

Furthermore, since heating is performed merely for adsorption columns, it is possible to perform collection of a gas with minimum energy consumption, and therefore, it is possible to reduce a gas recovery cost.

Furthermore, since a high value added gas which is extremely rare and expensive can be separated and collected to recycle it, it is possible to save money.

BEST MODE FOR CARRYING OUT THE INVENTION

While examples of the present invention are explained below, it should be understood that the present invention is not limited to the examples. Additions and modifications of number, position, size, value and the like can be made without departing from the scope of the present invention.

Figure 1:
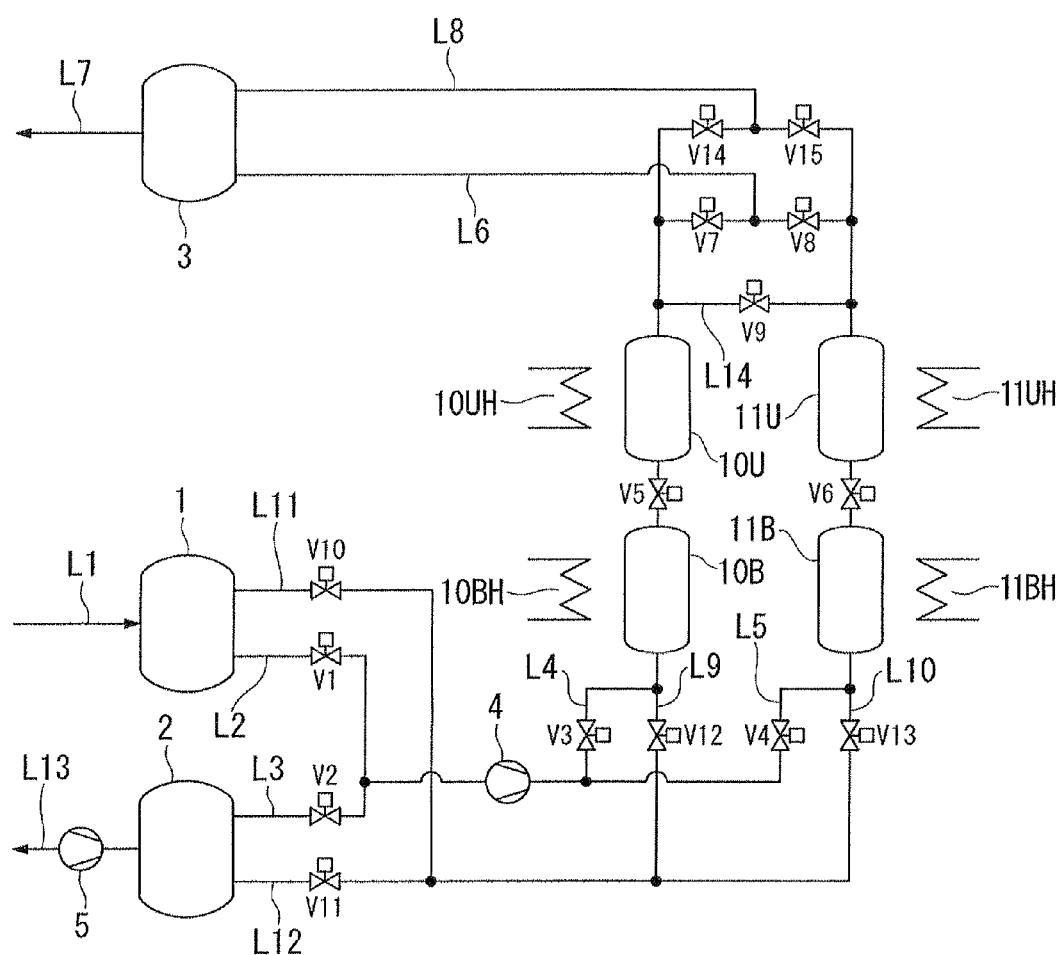
FIG. 1 is a schematic block diagram which shows an example of a collection apparatus for a high value added gas wherein a pressure swing adsorption-type gas separation method of the present invention is used.
Figure 2:
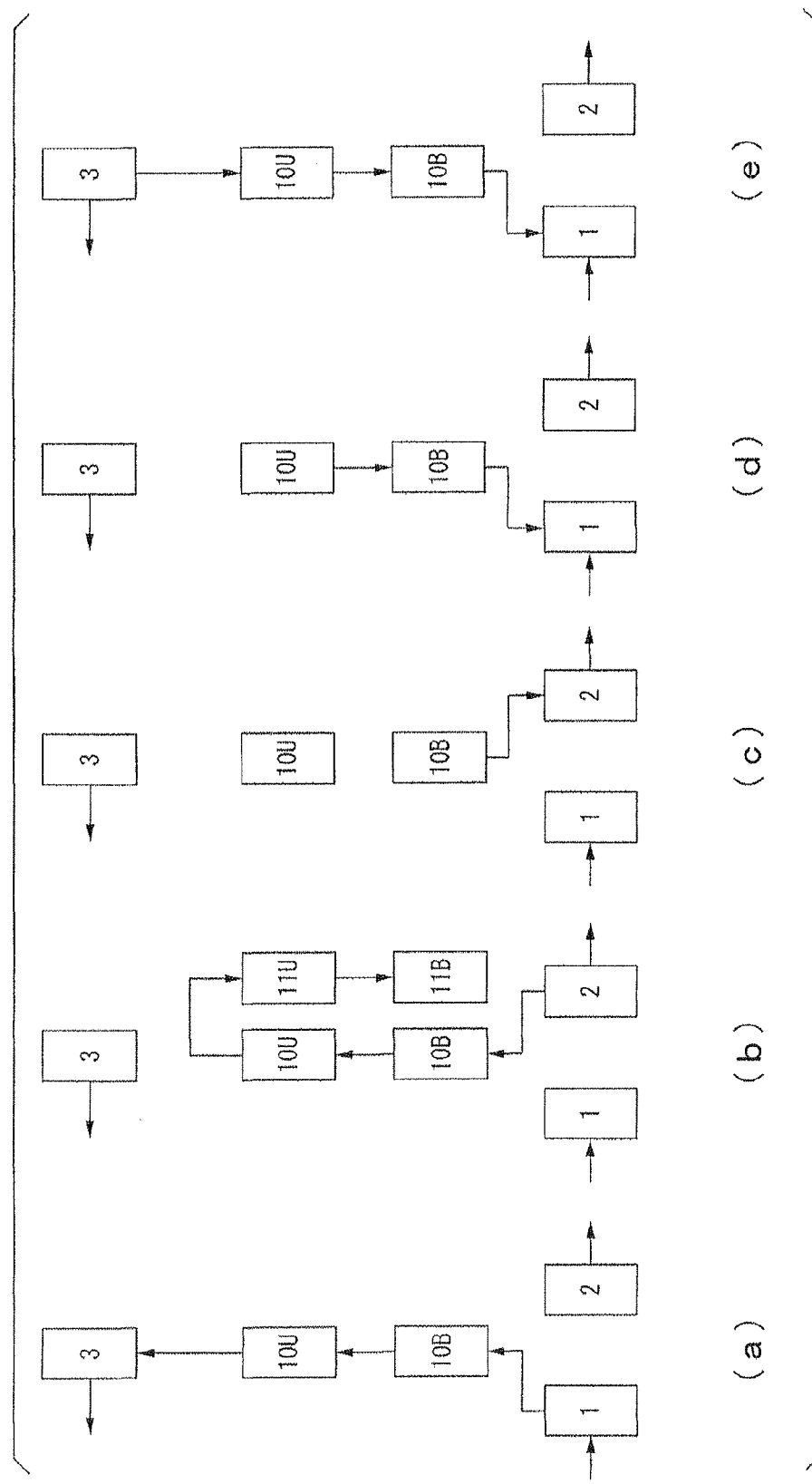
FIG. 2 shows a collecting step of a high value added gas wherein a conventional pressure swing adsorption-type gas separation method is used.
Figure 3:
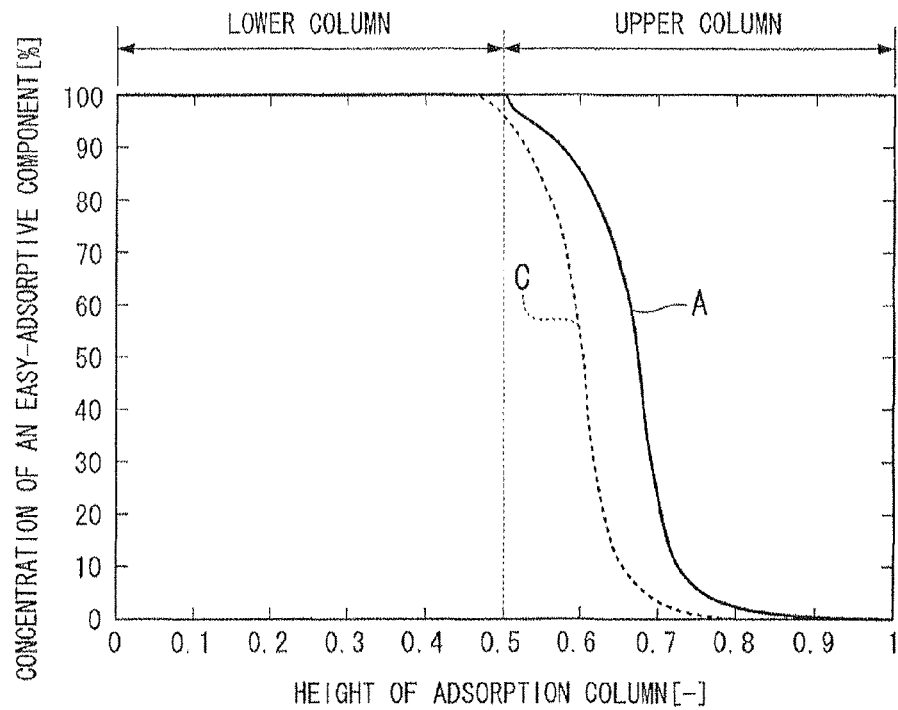
FIG. 3 is a schematic diagram which shows concentration distribution of a strong adsorbate in an adsorption column (when an environment temperature is decreased).
Figure 4:
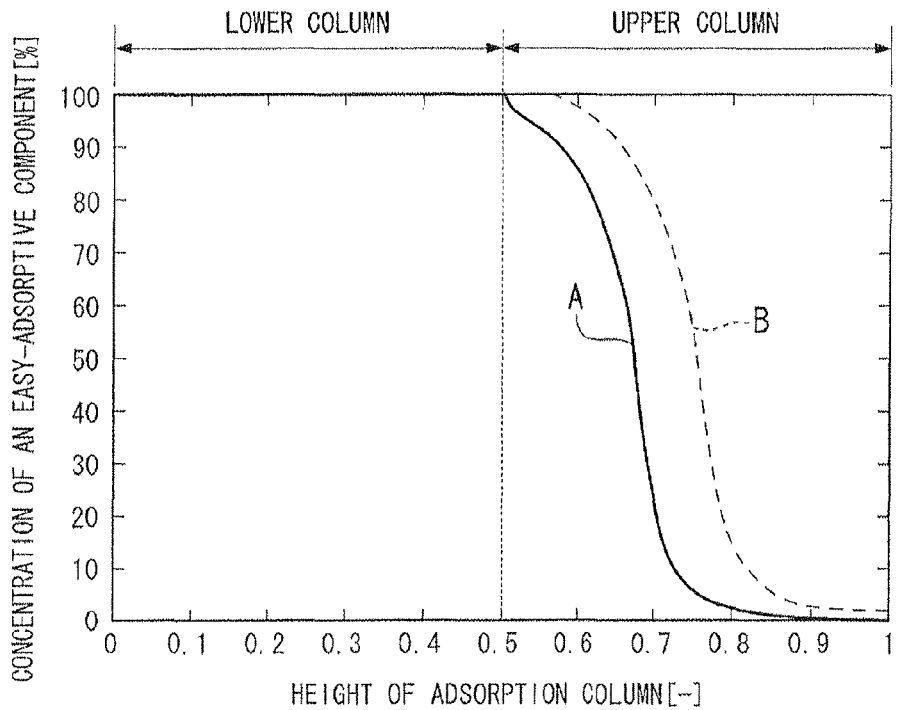
FIG. 4 is a schematic diagram which shows concentration distribution of a strong adsorbate in an adsorption column (when an environment temperature is increased).
Figure 5:
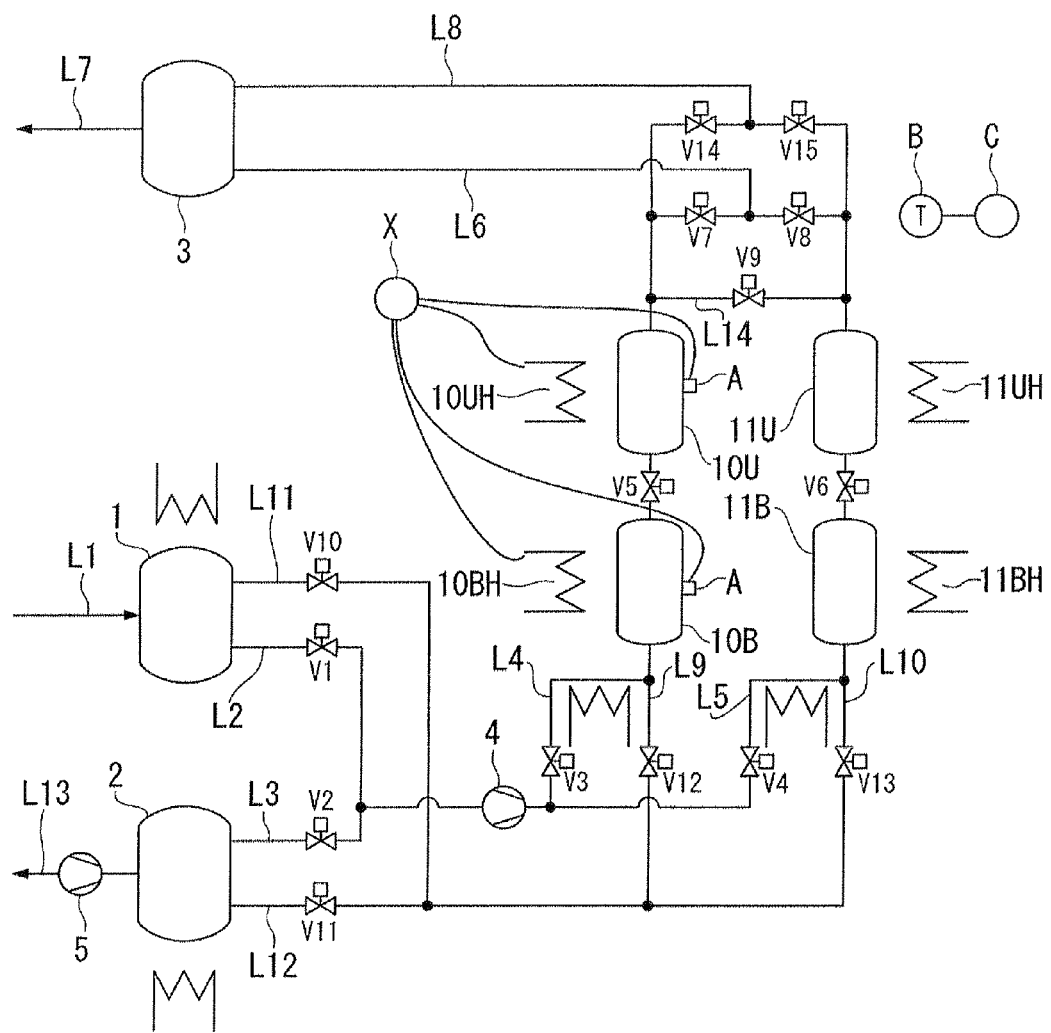
FIG. 5 is a schematic block diagram which shows an example of a collecting apparatus of a high value added gas wherein a pressure swing adsorption-type gas separation method of the present invention is used.

FIG. 1 shows an example of an apparatus for collecting a high value added gas wherein a pressure swing adsorption-type gas separation method of the present invention is used.

At first, a schematic structure of the apparatus shown in FIG. 1 is explained.

The apparatus for collecting a high value added gas includes: a feed gas storage tank 1 which stores a gas mixture as a feed gas wherein the gas mixture includes a component (target component) which is intended to be collected and one or more kinds of other components; a strong adsorbate storage tank 2 which stores a strong adsorbate; a weak adsorbate storage tank 3 which stores a weak adsorbate; a compressor 4 which compresses a gas included in the feed gas storage tank 1 or a gas included in the strong adsorbate storage tank 2; a compressor 5 which compresses a gas included in the strong adsorbate storage tank 2; lower columns 10B and 11B; upper columns 10U and 11U; heating devices 10BH and 11BH which heat and keep warm the lower columns 10B and 11B; and heating devices 10UH and 11UH which heat and keep warm the upper columns 10U and 11U. In the example, four adsorption columns are provided as upper columns and lower columns in total. In addition, a thermal control unit X is provided which measures a temperature of adsorbents with a thermometer A or the like and controls heating devices 10BH, 11BH, 10UH and 11UH so that each temperature of the adsorbents, which fill the upper columns and the lower columns, is maintained to be higher than the maximum temperature of an ambient temperature around the columns, wherein the ambient temperature varies throughout the year. In addition, a thermometer B which is used to measure an ambient temperature may be provided, and a device C such as an alarm or a light which informs a user that an ambient temperature exceeds the preset temperature may be provided. In the present invention, the highest temperature of an ambient temperature may be either of the maximum temperature of an ambient temperature throughout a period when a device is operated, or throughout a total period when a device is operated and is not operated. Here, a position where a temperature of an adsorbent is measured with a thermometer, a thermocouple, a resistance thermometer sensor, a thermistor, a radiation thermometer or the like, is preferably provided within a center of an adsorbent layer filled in each column, or on the exterior surface of each column wherein the position corresponds to a central height of the adsorbent layer. However, a point where measurement is performed is not limited in so far as a temperature of an adsorbent included in an adsorption column can be determined.

In the present invention, a target component which should be collected may be a strong adsorbate, a weak adsorbate or both of the adsorbates. Furthermore, a gas mixture may consist of two components, or may be other gases. A weak adsorbate and a strong adsorbate which can be separated in the present invention are selected optionally. Examples thereof include; noble gases such as helium, neon, argon, krypton and xenon, nitrogen, oxygen, hydrogen, carbon dioxide, carbon monoxide, hydrocarbons such as ethane and methane, and perfluorocarbons (PFCs) such as sulfur hexafluoride and carbon tetrafluoride. An adsorbent also can be selected optionally in the present invention, and examples thereof include zeolite, alumina and activated carbon.

A sign L1 represents a line which introduces a feed gas into a feed gas storage tank 1.

A sign L2 represents a line which carries a gas from the feed gas storage tank 1 to a compressor 4.

A sign L3 represents a line which carries a gas from a strong adsorbate storage tank 2 to the compressor 4.

Signs L4 and L5 represent lines which introduce a gas to lower columns 10B and 11B from the compressor 4.

A sign L6 represents a line which introduces a gas carried from upper columns 10U and 11U to a weak adsorbate storage tank 3.

A sign L7 represents a line which introduces a weak adsorbate included in a weak adsorbate storage tank 3 to the outside of the apparatus.

A sign L8 represents a line which introduces a weak adsorbate included in a weak adsorbate storage tank 3 to the upper columns 10U and 11U as a counter-flow purge gas.

Signs L9 and L10 represent lines which return a gas included in the lower columns 10B and 11B to the feed gas storage tank 1 or the strong adsorbate storage tank 2.

A sign L11 represents a line which returns a gas included in the lower columns 10B and 11B to the feed gas storage tank 1.

A sign L12 represents a line which returns a gas included in the lower columns 10B and 11B to the strong adsorbate storage tank 2.

A sign L13 represents a line which supplies a strong adsorbate which is sent from the strong adsorbate storage tank 2 to the outside of the apparatus.

A sign L14 represent a pressure equalized line where pressure is equalized between upper columns 10U and 11U.

The lower columns 10B and 11B and the upper columns 10U and 11U are filled with an adsorbent which has strong adsorbability or weak adsorbability with respect to a target component included in a feed gas, but shows weak adsorbability or strong adsorbability with respect to a component which is included in the feed gas but is other than the target component.

Next, an example of an embodiment of a pressure swing adsorption-type gas separation method of the present invention is explained below using FIG. 1. Here, in the pressure swing adsorption-type gas separation method of the embodiment, a case is explained wherein xenon is included as a main component and neon is included as the other main component in a gas. This gas hardly includes gases other than xenon and neon.

An equilibrium separation type activated carbon is used as an adsorbent filled in the lower columns 10B and 11B and upper columns 10U and 11U.

Activated carbon has characteristics wherein, as an equilibrium adsorption amount, an amount of adsorbing xenon is large (strong adsorbability) but an amount of adsorbing neon is small (weak adsobability).

Furthermore, the heating devices 10BH, 11BH, 10UH and 11UH are used for lower columns 10B and 11B and upper columns 10U and 11U, and a temperature control device controls the heating devices so that a temperature of adsorbents filled in the columns is always maintained uniformly.

That is, lower columns 10B and 11B and upper columns 10U and 11U, which are adsorption columns for separating a weak adsorbate and a strong adsorbate, are heated such that: a position, which exists on the outer surface of the adsorption columns and includes a part corresponding to the middle of the adsorbent filled layer, is heated with heating devices 10BH, 11BH 10UH and 11UH at a temperature which exceeds the maximum of an ambient temperature which varies throughout the year. For example, when the highest temperature of an ambient temperature around adsorption columns, wherein the ambient temperature varies throughout the year, is 28° C., the columns can be heated at a certain temperature in a range of 30 to 300° C., preferably 30 to 80° C. and more preferably 30 to 50° C., and the adsorption columns are constantly heated during the separation apparatus is operated.

A temperature of an adsorbent which fills an adsorption column wherein a temperature thereof is controlled is preferably measured directly in a filled adsorbent layer at the center of the layer. However, when such a direct measurement is performed, there is a possibility that disturbance of a gas flow is caused in the adsorption column due to a temperature sensor inserted in the layer, and a breakthrough band is in disorder. Therefore, a temperature measured at a position, which exists on the outer surface of an adsorption column and corresponds to the middle of an adsorbent filled layer, is considered as an adsorbent temperature, since such a temperature can be easily measured without causing disturbance of a gas flow in the adsorption column. By the aforementioned method, a temperature of an adsorbent of an adsorption column is always controlled uniformly by controlling a temperature of an outer surface of the middle of the adsorption column.

There is a case where a temperature of a position, which exists on the outer surface of an adsorption column and corresponds to the middle of a filled adsorbent layer of the adsorbent column, is somewhat different from an adsorbent temperature of the adsorption column. However, even if such a temperature difference is caused to some extent, the effect of the present invention can be provided in so far as an ambient temperature around the adsorption columns affects a temperature within the adsorption columns.

A material used for forming columns can be selected optionally, and stainless steel such as SUS316L and SUS304L and alloy such as inconel and hastelloy can be used. The kind, size, form and position of the heating devices 10BH, 11BH, 10UH and 11UH can be determined optionally. Preferable examples of a heating device include a resistance type electric heater such as a mantle heater, a thermostat which uses hot air, hot water or the like as a medium, and an induction heat type heater.

It is possible to determine the highest temperature of an ambient gas around adsorption columns, wherein the ambient temperature varies throughout the year, using data wherein an ambient temperature has been measured throughout one or more years at a position where an apparatus will be provided, if such data has been measured. On the other hand, if there is another suitable method, it is acceptable to use such a method.

If an apparatus is provided in a room but there is no data wherein a temperature in the room has been measured throughout the year, for example, it is possible to determine the highest temperature of an ambient temperature around columns such that a temperature difference between inside and outside the room is measured, information regarding the highest temperature of an outside in this area is gained, and a value is obtained as said ambient temperature by subtracting or adding said temperature difference from or to the highest temperature of the outside in this area. When an apparatus is provided to the outside, the highest temperature can be determined by studying the maximum temperature of external air of last year or of several past years. When the maximum temperature which may change every year is taken into consideration, for example, it is preferable that heating be performed at a temperature which is at least 2° C. higher, more preferably is 5° C. higher, than the maximum temperature of an ambient temperature of last year. For example, it is preferable that heating be performed at a temperature which is selected from about 5 to 50° C. higher than the maximum temperature of an ambient temperature.

Furthermore, in the present invention, it is preferable that heating devices 10BH, 11Bh, 10UH and 11UH be controlled such that a temperature of the upper columns 10U and 11U be less than that of the lower columns 10B and 11B, and more preferably a temperature of the upper columns 10U and 11U be 5° C. or more lower than that of the lower columns 10B and 11B. When the sizes of the columns are identical to each other, an amount of a gas adsorbed to an adsorbent of the upper columns 10U and 11U at a low temperature is larger than an amount of a gas adsorbed to an adsorbent of the lower columns 10B and 11B.

Therefore, as compared with a case wherein the lower columns 10B and 11B and upper columns 10U and 11U are controlled at the same temperature, it is possible to expect that a collection rate of a strong adsorbate is increased, since purity of a strong adsorbate increases due to acceleration of saturation of a strong adsorbate adsorbed in the lower columns 10B and 11B in the step b and due to an increase of an amount of a strong adsorbate adsorbed in the upper columns 10U and 11U. Preferable controlling examples include a case wherein the lower columns are heated in a range of 30 to 80° C., the upper columns are heated in a range of 25 to 75° C. and a temperature of the upper columns is 5° C. or more lower than a temperature of the lower columns.

Furthermore, in order to heat a gas which is introduced to the lower columns 10B and 11B in advance, it is preferable that a feed gas storage tank 1, a strong adsorbate storage tank 2 and lines L4 and L5, which are used to introduce a gas to the lower columns, be heated with a heater or the like at a temperature which is higher than or equal to a heating temperature of the lower columns 10B and 11B, and such a heating can increase purity of a strong adsorbate.

A gas separation method of this embodiment includes six steps which consist of a step a, a step b, a step c, a step d, a step e and a step f. Opening and closing of valves can be determined optionally, but in this example, opening and closing of valves V1 to V15 in each step are controlled according to conditions shown in Table 1.

TABLE 1

| 10B 10U | Step a | | | Step b | Step c | Step d | Step e | Step f |
|---|---|---|---|---|---|---|---|---|
| 11B 11U | Step c | Step d | Step e | Step f | | Step a | | Step b |
| V1  | ○ | ○ | ○ | X | ○ | ○ | ○ | X |
| V2  | X | X | X | ○ | X | X | X | ○ |
| V3  | ○ | ○ | ○ | ○ | X | X | X | X |
| V4  | X | X | X | X | ○ | ○ | ○ | ○ |
| V5  | ○ | ○ | ○ | ○ | X | ○ | ○ | ○ |
| V6  | X | ○ | ○ | ○ | ○ | ○ | ○ | ○ |
| V7  | ○ | ○ | ○ | X | X | X | X | X |
| V8  | X | X | X | X | ○ | ○ | ○ | X |
| V9  | X | X | X | ○ | X | X | X | X |
| V10 | X | ○ | ○ | X | X | ○ | X | X |
| V11 | ○ | X | X | X | ○ | X | X | X |
| V12 | X | X | X | X | ○ | ○ | ○ | X |
| V13 | ○ | ○ | ○ | X | X | X | X | X |
| V14 | X | X | X | X | X | X | ○ | X |
| V15 | X | X | ○ | X | X | X | X | X |

○: Opened
X: Closed

Hereinafter, each step for separation wherein a separation apparatus of the present invention is used is explained with respect to separation wherein the adsorption columns 10B and 10U are used. In the apparatus, separation using adsorption columns 11 B and 11U proceeds simultaneously.

(Step a)

A feed gas is sent from a feed gas storage tank 1 into a compressor 4 via a line L2 to be compressed, and then the gas is supplied to the lower column 10B via a line L4.

A valve V5, which exists between the lower column 10B and the upper column 10U, is opened so that a gas can flow through the valve. Accordingly, pressure of the lower column 10B and pressure of the upper column U increase almost similarly. Here, a feed gas included in the feed gas storage tank 1 is a feed gas introduced by a line L1, or a gas mixture wherein such a feed gas and an exhaust gas are mixed wherein the exhaust gas is exhausted from the lower column 10B in steps d and e which are described below.

The feed gas supplied to the lower column 10B in the step a is sent from the lower portion of the lower column 10B to the upper portion thereof, and xenon included in the feed gas is preferentially adsorbed in an adsorbent of the lower column 10B, and as a result, neon is concentrated. The concentrated neon is discharged from the lower column 10B, and subsequently, introduced into the upper column 10U. A small amount of xenon, which is included in the neon introduced in the upper column 10U, is adsorbed by the upper column 10U and neon is further concentrated.

Once the pressure of the upper column 10U is higher than that of the weak adsorbate storage tank 3, neon which is concentrated in the upper column 10U is sent to the weak adsorbate storage tank 3 via a line L6. Neon included in the weak adsorbate storage tank 3 is exhausted to the outside of the apparatus from a line L7 at a flow rate corresponding to a flow rate of neon included in the supplied feed gas, and the remaining gas is used in a step e as a purge gas which provides a counter-flow.

(Step b)

A valve V1 is closed and a valve V2 is opened, so that a gas which is sent to the lower column 10B is switched to xenon included in the strong adsorbate storage tank 2. By introducing xenon to the lower column 10B from the strong adsorbate storage tank 2, neon which has been co-adsorbed by an adsorbent-filled layer of the lower column 10B and neon which was present in an air space of the adsorbent are ejected to the upper column 10U, and the interior of the lower column 10B is saturated by adsorbed xenon. Xenon which is discharged from the lower column 10B is adsorbed by the upper column 10U.

Neon which has been concentrated in the upper column 10U is sent, via a line L14, to the upper column 11U, or to the upper column 11U and the lower column 11B, by opening V9 and V6 in the step b.

(Step c)

After the step b is completed valves V2, V3, V5 and V9 are closed, and valves V11 and V12 are opened. Due to the this, xenon which has been adsorbed by the lower column 10B in the steps a and b, is collected in the strong adsorbate storage tank 2 via lines L9 and L12, due to the pressure difference between the lower column 10B and the strong adsorbate storage tank 2.

Xenon collected in the strong adsorbate storage tank 2 is compressed by a compressor 5 at a flow rate which corresponds to xenon included in the supplied feed gas, and is collected via a line L 13 as a product. The remaining xenon is used in the step b as a purge gas which provides a parallel flow. During the step, operation of the upper column 10U stops, since valves V5, V7, V9 and V14 are closed.

(Step d)

After the step c is completed, valve V11 is closed and valves V5 and V10 are opened. As a result, a pressure difference is caused between the upper column 10U which has not been operated in the step c and the lower column 10B which has been decompressed, and a gas included in the upper column 10U is introduced in the lower column 10B.

The gas which enters the lower column 10B purges the interior of the lower column 10B, and a gas exhausted from the lower column 10B is collected by the feed gas storage tank 1 via lines L9 and L11. A gas collected in the feed gas storage tank 1 is mixed with a feed gas which is introduced from a line L1, and is supplied again to the lower column 10B or 11B in the step a.

(Step e)

After the step d is completed, the valve V14 is opened, and neon which has been stored in the weak adsorbate storage tank 3 is introduced into the upper column 10U via a line L8 as a purge gas which provide a counter-flow. Neon introduced into the upper column 10U moves to the downstream side of the adsorption column 10U, and xenon which has been adsorbed to the column is substituted and desorbed by the neon.

A gas which includes a comparatively large amount of desorbed xenon is collected to the feed gas storage tank 1 via the lower column 10B and the lines L9 and L11. Similar to the step d, the gas collected in the feed gas storage tank 1 is mixed with a feed gas which is introduced from the line L1, and is supplied again to the lower column 10B or 11B to which the step a is performed.

(Step f)

Valves V10, V12 and V14 are closed, and the valve V9 is opened. Neon concentrated in the upper column 11U by the step b is sent to the upper column 10U via a line L14. Since the neon concentration of a gas which is introduced to the upper column 11U is high, xenon which has been co-adsorbed in an adsorbent-filled layer of the upper column 10U is pressed down toward the lower column 10B. Subsequently, a step a can be performed.

It is possible to perform concentration of neon and xenon in succession, by repeatedly conducting the aforementioned six steps for the lower column 10B and the upper column 10U, and for the lower column 11B and the upper column 11U, in turn.

As shown in Table 1, when steps a and b are performed in the lower column 10B and the upper column 10U, steps c to f are performed for the lower column 11B and the upper column 11U.

On the other hand, when steps c to f are performed in the lower column 10B and the upper column 10U, steps a and b are performed for the lower column 11B and the upper column 11U.

Hereinafter, concrete examples are explained.

Experiments (Example and Comparative Example) were performed wherein xenon is separated with a pressure swing adsorption-type gas separation apparatus shown in FIG. 1 using a gas mixture as a feed gas which includes xenon and neon. Here, the gas mixture hardly includes components other than xenon and neon.

Comparative Example 1

In a pressure swing adsorption-type gas separation apparatus shown in FIG. 1, the lower columns 10B and 11B and upper columns 10U and 11U have a schematic form wherein they are cylindrical containers having an inner diameter of 83.1 mm and a filled height of 600 mm. 1.4 kg of an activated carbon fills each column as an adsorbent.

Compressors 4 and 5 wherein each capacity thereof is 20 L/min and 0.2 L/min were used (a flow rate (L/min) is a value converted based on 0° C. and 1 atm air pressure, and hereinafter said value is used).

The device was operated at a cycle time of 600 seconds, and the time of each step was controlled according to the time sequence shown in Table 2. However, heating was not performed with a heating device.

A flow rate of a feed gas introduced to a feed gas storage tank 1 is 2.2 L/min, and the concentration of xenon of the gas is about 9% by volume, and the concentration of neon of the gas is about 91% by volume. Furthermore, a flow rate of xenon discharged from the strong adsorbate storage tank 2 was set to 0.2 L/min, and a flow rate of neon discharged from the weak adsorbate storage tank 2 was set to 2 L/min.

TABLE 2

| 10B 10U | Step a | | Step b | Step c | Step d | Step e | Step b |
|---|---|---|---|---|---|---|---|
| 11B 11U | Step c | Step d | Step e | Step b | | Step a | | Step b |
| Time | 45 sec | 95 sec | 65 sec | 95 sec | 45 sec | 95 sec | 65 sec | 95 sec |

According to the aforementioned operating conditions, continuous operation was performed for about 24 hours at a constant ambient temperature of 25° C., without controlling a temperature with heating devices 10BH, 11BH, 10UH and 11 UH. As a result, it was confirmed that the concentration of neon exhausted from a line L7 and the xenon concentration exhausted from a line L13 were set to almost constant values and a steady-state circulation was achieved.

Under the condition that steady-state circulation was maintained, both the concentration of xenon included in neon exhausted from a line L7 and the concentration of neon included in xenon exhausted from a line L13 were slight and about 50 ppm. These results show that both the neon concentration and xenon concentration were about 99.995%, a collection rate of neon was about 99.9995%, and a collection rate of xenon was about 99.95%.

Comparative Example 2

Subsequent to Comparative Example 1, continuous operation was performed for about 24 hours without controlling a temperature with heating devices 10BH, 11BH, 10UH and 11UH, similar to Comparative Example 1, except that an ambient temperature was set to 20° C. It was confirmed that the concentration of neon exhausted from a line L7 and the concentration of xenon exhausted from a line L13 settled to almost constant values and a steady-state circulation was achieved.

Under the condition that steady-state circulation was maintained, the concentration of xenon included in neon exhausted from a line L7 was about 30 ppm, and the concentration of neon included in xenon exhausted from a line L13 was about 5%. The results show that the neon concentration was about 99.997%, xenon concentration was about 95%, a collection rate of neon was about 99.5% and a collection rate of xenon was about 99.97%.

Comparative Example 3

Subsequent to Comparative Example 2, continuous operation was performed for about 24 hours without controlling a temperature with heating devices 10BH, 11BH, 10UH and 11UH, similar to Comparative Example 1, except that an ambient temperature was set to 30° C. It was confirmed that the concentration of xenon included in neon was merely about 100 ppm, and the concentration of neon included in xenon was merely about 40 ppm. The results show that the neon concentration was about 99.99%, xenon concentration was about 99.996%, a collection rate of neon was about 99.9996%, and a collection rate of xenon was about 99.9%.

Example

Similar to Comparative Examples, operations were performed except that heating devices 10BH, 11BH, 10UH and 11 UH, which were not used in Comparative Examples, were used to set a temperature of the columns at 35° C., wherein the position is on the surface of the adsorption columns and corresponds to the middle of a height of an adsorbent-filled layer of each column. Although an ambient temperature was set to 20° C., 25° C. or 30° C., the concentration of xenon included in neon exhausted from a line L7 was about 200 ppm and the concentration of neon included in xenon exhausted from a line L13 was about 40 ppm in any case, that is, uniform results were obtained. The results show that the neon concentration was 99.98%, xenon concentration was about 99.996%, a collection rate of neon was about 99.9996%, and a collection rate of xenon was about 99.8%.

In this way, it was found that the purity and collection ratio of neon and xenon can be maintained even if an ambient temperature is changed.

INDUSTRIAL APPLICABILITY

The present invention can be used as a pressure swing adsorption-type gas separation method and an apparatus which enables cyclic use of a high value added gas at low cost.

That is, the purpose of the present invention is to provide a pressure swing adsorption-type gas separation method and apparatus, wherein the purity and collection ratio of a strong adsorbate and a weak adsorbate can be maintained without decreasing them even if a temperature of an adsorbent is changed according to variations in an ambient temperature.

BRIEF DESCRIPTION OF THE REFERENCE SYMBOLS

1. Feed gas storage tank
2. Strong adsorbate storage tank
3. Weak adsorbate storage tank
4, 5. Compressors
10B, 11B. Lower columns
10U, 11U. Upper columns
10BH, 11BH, 10UH, 11UH. Heating devices

The invention claimed is:

1. A pressure swing adsorption-type gas separation method, which separates a component which is easily adsorbed by an adsorbent and a component which is not easily adsorbed by the adsorbent, from a feed gas which includes at least two kinds of components, with adsorption columns, wherein
the adsorbent is filled in the adsorption columns, and the adsorbent has strong adsorbability with respect to at least one kind of component included in the feed gas, and also has weak adsorbability with respect to at least one kind of other components included in the feed gas, and
a temperature of the adsorbent which is filled in the columns is maintained to be higher than the highest temperature of an ambient temperature around the adsorption columns, which is variable throughout the year,
wherein the adsorption columns are structured with a lower column and an upper column, and a temperature of the upper column is controlled to be less than a temperature of a lower column.

2. The pressure swing adsorption-type gas separation method according to claim 1, wherein the adsorption columns are constantly heated during operation of the separation apparatus.

3. The pressure swing adsorption-type gas separation method according to claim 1, wherein the temperature of the adsorbent which is filled in the columns is maintained at a temperature which is selected from 5 to 50° C. higher than the maximum temperature of an ambient temperature.

4. A pressure swing adsorption-type gas separation apparatus, which comprises:
 adsorption columns which include an upper column and a lower column wherein the columns are filled with an adsorbent which has strong adsorbability with respect to at least one kind of component included in a feed gas and also has weak adsorbability with respect to at least one kind of other components included in the feed gas, wherein the feed gas includes at least two kinds of components;
 a heating device which is provided to the upper column and the lower column to heat the columns wherein a temperature of the upper column is controlled to be less than a temperature of the lower column; and
 a temperature control device which controls the heating device and maintains a temperature of the adsorbent which is filled in the columns to be higher than the highest temperature of an ambient temperature around the columns which is variable throughout the year.

5. The pressure swing adsorption-type gas separation apparatus according to claim 4, wherein the adsorption columns are constantly heated by the heating device, during operation of the separation apparatus.

6. The pressure swing adsorption-type gas separation apparatus according to claim 4, wherein the temperature of the adsorbent, which is filled in the columns, is maintained by the temperature control device at a temperature which is selected from 5 to 50° C. higher than the maximum temperature of an ambient temperature.

* * * * *